United States Patent
Phillips

(10) Patent No.: US 11,441,266 B2
(45) Date of Patent: Sep. 13, 2022

(54) DISRUPTOR ASSEMBLY ADJUSTMENT SYSTEM AND METHOD

(71) Applicant: Andritz Inc., Alpharetta, GA (US)

(72) Inventor: John Phillips, Alpharetta, GA (US)

(73) Assignee: ANDRITZ INC., Alpharetta, GA (US)

(*) Notice: Subject to any disclaimer, the term of this patent is extended or adjusted under 35 U.S.C. 154(b) by 0 days.

(21) Appl. No.: 16/953,843

(22) Filed: Nov. 20, 2020

(65) Prior Publication Data
US 2021/0189649 A1 Jun. 24, 2021

Related U.S. Application Data

(60) Provisional application No. 62/951,481, filed on Dec. 20, 2019.

(51) Int. Cl.
*D21C 11/12* (2006.01)
*D21G 9/00* (2006.01)
*G01N 29/02* (2006.01)

(52) U.S. Cl.
CPC ......... *D21C 11/122* (2013.01); *D21G 9/0009* (2013.01); *G01N 29/02* (2013.01)

(58) Field of Classification Search
CPC ..... D21C 11/122; D21G 9/0009; G01N 29/02
See application file for complete search history.

(56) References Cited

U.S. PATENT DOCUMENTS

| | | |
|---|---|---|
| 5,545,292 A | 8/1996 | Empie |
| 5,976,319 A | 11/1999 | Paju et al. |
| 9,206,548 B2 | 12/2015 | Kujanpaa |
| 10,012,616 B2 | 7/2018 | Aura et al. |
| 10,557,235 B2 | 2/2020 | LeBel |
| 2011/0186659 A1 | 8/2011 | Kujanpaa et al. |
| 2017/0131240 A1* | 5/2017 | Aura ............... G01N 29/02 |
| 2019/0024310 A1* | 1/2019 | LeBel ............... D21C 11/04 |

FOREIGN PATENT DOCUMENTS

| | | |
|---|---|---|
| EP | 3165671 | 5/2017 |
| EP | 3431654 | 1/2019 |
| WO | 2013071008 | 5/2013 |

OTHER PUBLICATIONS

European Application No. 20213760.0, Extended European Search Report dated May 19, 2021, 7 pages.

* cited by examiner

*Primary Examiner* — Roy Y Yi
*Assistant Examiner* — Geoffrey T Evans
(74) *Attorney, Agent, or Firm* — Kilpatrick Townsend & Stockton LLP

(57) ABSTRACT

A disruptor adjustment system comprising: a disruptor assembly configured to disrupt a volume of smelt flowing from a smelt spout into a dissolving tank, wherein the disruptor assembly comprises an actuator operatively engaged to a disruptor, a sensor configured to record process data from the recovery boiler; and a control system configured to receive a sensor output signal from the sensor, wherein the sensor output signal indicates the process data at a measured time, wherein the control system is further configured to compare the sensor output signal to a programmed operation range, and to send a disruptor input signal to the disruptor assembly to adjust a disruptor operating condition if the process data of the sensor output signal is outside of the programmed operation range. In certain exemplary embodiments, the sensor is an image capture device. In certain exemplary embodiments, the disruptor assembly can be adjusted remotely.

24 Claims, 8 Drawing Sheets

DISRUPTOR ASSEMBLY ADJUSTMENT SYSTEM AND METHOD

CROSS-RELATED APPLICATION

This application claims the benefit under 35 U.S.C. § 119(e) of the earlier filing date of U.S. Provisional Patent Application No. 62/951,481 filed on Dec. 20, 2019, the entire contents of which is incorporated herein by reference.

BACKGROUND OF THE INVENTION

1. Technical Field

The present disclosure relates generally to chemical pulping and particularly to recovery boilers and dissolving tanks used in the pulp and paper industry.

2. Related Art

In the chemical pulping industry, mill operators treat lignocellulosic material with either strong acids or strong bases to disassociate the lignin from the cellulosic fibers. Operators may then separate, wash, and further process the cellulosic fibers into pulp or other pulp-based products. Chemical process examples include: the Kraft process (also known as the "sulfate process"), the sulfite process, the soda pulping process, and the sulfite semi-chemical pulping process.

While the processing chemicals for each type of chemical process may vary, mill operators frequently recover and recycle these process chemicals to operate the mill economically. Many chemical pulp mills use pyrolytic chemical recovery systems to recycle at least a portion of the cooking chemicals In a typical chemical recovery process, operators heat and inject concentrated spent cooking chemicals, known generically as "black liquor," into a chemical recovery boiler. The recovery boiler evaporates the remaining water from the black liquor and solid compounds in the black liquor undergo partial pyrolysis. The remaining inorganic compounds fall to the bottom of the recovery boiler and then exit as molten liquid smelt.

This smelt exits through one or more smelt spouts at the bottom of the recovery boiler. As the smelt contacts green liquor in a dissolving tank, the smelt explodes and emits a series of audible sounds. This is generally known as "banging" by those in the industry. The smelt flowing from the spout is typically between 750 degrees Celsius ("° C.") to 820° C., while the average temperature of the green liquor is about 70° C. to 100° C.

To manage smelt dissolution, avoid excessive noise, and mitigate the possibility of catastrophic explosions, conventional dissolving tanks generally use disruptors to disrupt the smelt as the smelt falls from the spout into the dissolving tank. Disruptors can be one or more shatter jets, or other devices configured to disrupt the flow of smelt from the smelt spout prior to the smelt reaching the liquid level of the dissolving tank. A shatter jet blasts the falling smelt with steam or other shattering fluid at high pressure to create smelt droplets. These droplets collectively have a greater surface area than an undisrupted smelt flow. The individual droplets also have a smaller volume than an overall undisrupted smelt flow. The increased surface area and smaller volume of reactants permit banging explosions that are generally less intense than the explosions would be if the smelt contacted the green liquor as a continuous, uninterrupted, undisrupted flow.

In many mills, operators commonly move in and among the processing equipment to monitor process conditions and output. The flow of smelt from a spout is variable. Molten smelt may periodically accumulate behind temporary dams of inorganic material in the recovery boiler, and turbulent process conditions can occasionally send a jet of superheated gas from the spout opening. Even with appropriate protection, it is generally advisable for personnel to stand as far away from the spout openings as possible to avoid being proximate to the smelt spouts in an upset condition. An explosion in the dissolving tank or recovery boiler poses a serious safety risk to personnel in the immediate vicinity, and the resulting fire poses a serious risk to personnel in the rest of the mill. Such explosions also cause an unregulated amount of pollutants to enter the air and groundwater and predicate significant production loss. Explosions of this scale can inactivate a mill for weeks or months.

To accommodate variations in smelt flow, current shatter jets encourage operators to stand physically close to shatter jets to adjust the rate of steam flow and/or the position of the shatter jets manually. Depending upon the particular boiler, proximity of equipment relative to the shatter jets may reduce the operator's ease of access to steam flow adjustment valves. Such reduced access may encourage operators to stand too close to the spout opening, or position themselves in such a way that they will increase the risk of injury.

Furthermore, manual adjustment of the shatter jet can be time consuming and can quickly become out of step with the changing flow characteristics of the smelt. A typical recovery boiler may have about three to six smelt spouts on at least one side of the recovery boiler. By way of example, one person adjusting all of the shatter jets on a typical 3 million pounds of dry solids per day ("lbds/day") recovery boiler may take an average of 30 minutes. During that time, the process conditions inside the recovery boiler may be in a near constant state of flux. That is, by the time the operator finishes adjusting the shatter jets in response to a process condition measurement taken at the top of the hour, the recovery boiler may have experienced myriad changes in process conditions, thereby minimizing the effects of the operator's manual adjustments.

Previous innovations in this field have focused on reducing the risk of substantial smelt explosions. For example, U.S. Pat. No. 9,206,548, entitled, "Cooled Smelt Restrictor at Cooled Smelt Spout for Disrupting Smelt Flow from the Boiler," the entirely of which is incorporated here by reference, describes a single use emergency apparatus for rapidly closing the spout opening in the event of a smelt deluge.

U.S. Pat. No. 10,012,616, entitled, "Acoustic Emission System and Method for Predicting Explosions in a Dissolving Tank," and incorporated herein by reference in its entirety, describes a system configured to measure and evaluate banging in order to predict smelt explosions. While these systems have been generally effective at reducing explosions, both systems are reactive and generally trigger a failsafe just moments before an explosion might otherwise occur. Therefore, a failure of one of these systems at a critical moment could result in the same explosions that plagued conventional recovery boilers and dissolving tanks.

U.S. patent application Ser. No. 16/040,333, the entirely of which is incorporated herein by reference, describes an ultrasonic smelt dissolving and shattering system configured to reduce the time needed to dissolve smelt in a dissolving tank.

SUMMARY OF THE INVENTION

The problem of exposing recovery boiler operators to safety risks as a result of operators manually adjusting disruptors in response to changing smelt flow characteristics and the problem of dissociated smelt flow characteristics and disruptor operating condition (e.g. disruptor position and disrupting fluid output) is solved by a disruptor adjustment system comprising: a disruptor assembly configured to disrupt a volume of smelt flowing from a smelt spout into a dissolving tank, wherein the disruptor assembly comprises an actuator operatively engaged to a disruptor, a sensor configured to record process data from the recovery boiler; and a control system configured to receive a sensor output signal from the sensor, wherein the sensor output signal indicates the process data at a measured time, wherein the control system is further configured to compare the sensor output signal to a programmed operation range, and to send a disruptor input signal to the disruptor assembly to adjust a disruptor operating condition if the process data of the sensor output signal is outside of the programmed operation range.

The shatter jet nozzle adjustment mechanism would be designed to allow an electrical or pneumatic actuator to adjust the position (insertion depth and angle) based on process data from the recovery boiler. The process data may include, but is not limited to, smelt flow leaving the smelt spout, dissolving tank operational data, and smelt spout cooling water temperatures.

The shatter jet nozzle could also be controlled remotely based on information from a camera.

The exemplary systems described herein may further increase personnel safety by eliminating the need for operating personnel to adjust manually the flow of fluid through the shatter jets and/or the position of the shatter jets during normal, upset, or transient conditions.

BRIEF DESCRIPTION OF THE DRAWINGS

The foregoing will be apparent from the following more particular description of exemplary embodiments of the disclosure, as illustrated in the accompanying drawings in which like reference characters refer to the same parts throughout the different views. The drawings are not necessarily to scale, with emphasis instead being placed upon illustrating the disclosed embodiments.

DETAILED DESCRIPTION OF THE INVENTION

Figure 1:
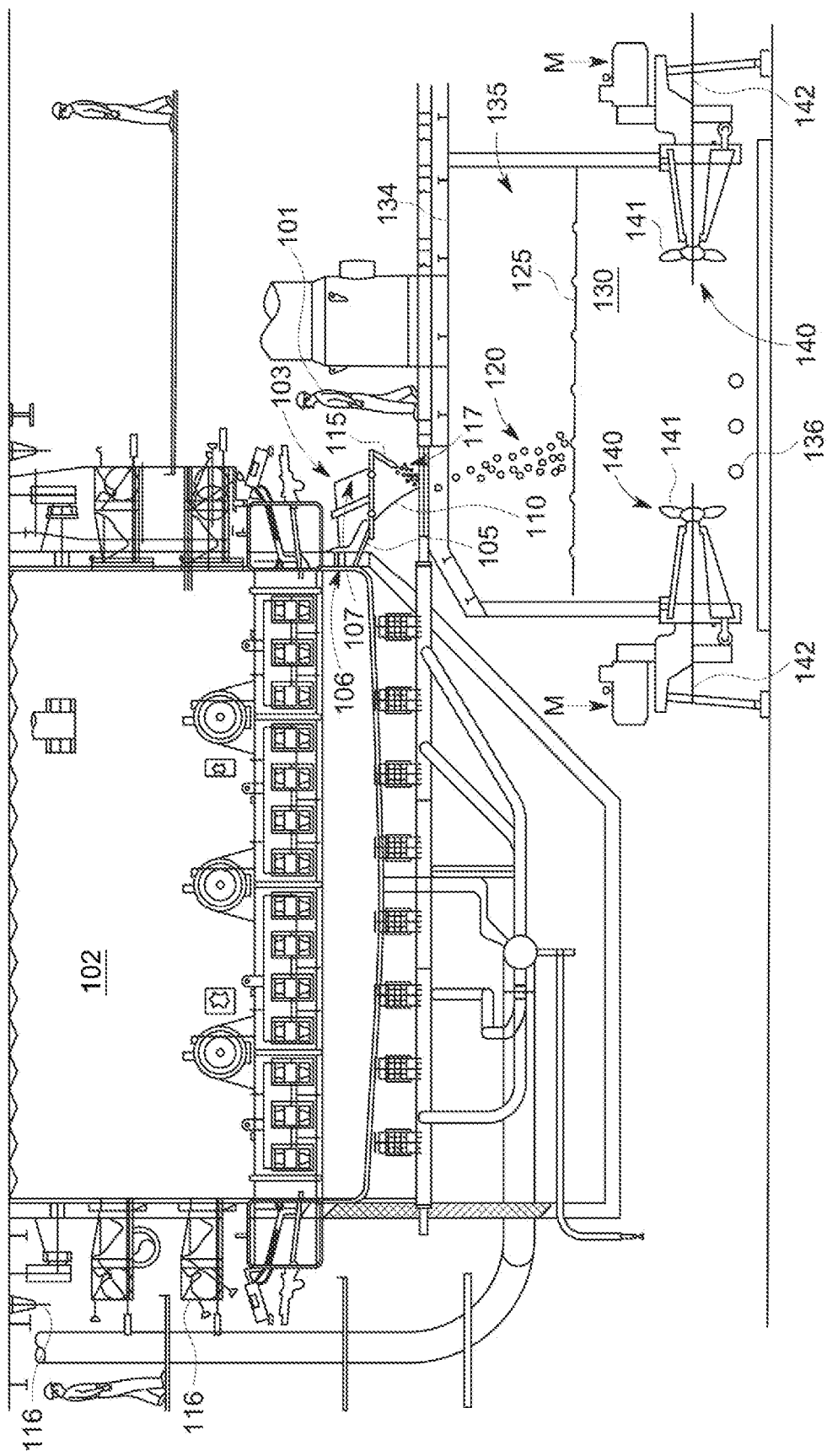
FIG. 1 is a schematic representation of a side view of the bottom of a recovery boiler, a smelt spout, a dissolving tank, and a disruptor configured to disrupt the flow of smelt.

The following detailed description of the preferred embodiments is presented only for illustrative and descriptive purposes and is not intended to be exhaustive or to limit the scope and spirit of the invention. The embodiments were selected and described to best explain the principles of the invention and its practical application. One of ordinary skill in the art will recognize that many variations can be made to the invention disclosed in this specification without departing from the scope and spirit of the invention.

Corresponding reference characters indicate corresponding parts throughout the several views. Although the drawings represent embodiments of various features and components according to the present disclosure, the drawings are not necessarily to scale and certain features may be exaggerated in order to better illustrate embodiments of the present disclosure, and such exemplifications are not to be construed as limiting the scope of the present disclosure in any manner.

References in the specification to "one embodiment," "an embodiment," "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Although specific terms are used in the following description for the sake of clarity, these terms are intended to refer only to the particular structure of the embodiment selected for illustration in the drawings, and are not intended to define or limit the scope of the disclosure.

The singular forms "a," "an," and "the" include plural referents unless the context clearly dictates otherwise. Numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and are independently combinable (for example, the range "from 2 millimeters to 10 millimeters" is inclusive of the endpoints, 2 millimeters and 10 millimeters, and all intermediate values).

As used herein, approximating language may be applied to modify any quantitative representation that may vary without resulting in a change in the basic function to which it is related. Accordingly, a value modified by a term or terms, such as "about" and "substantially," may not be limited to the precise values specified. The modifier "about" should also be considered as disclosing the range defined by the absolute values of the two endpoints. For example, the expression "from about 2 to about 4" also discloses the range "from 2 to 4."

It should be noted that many of the terms used herein are relative terms. For example, the terms "upper" and "lower" are relative to each other in location, i.e. an upper component is located at a higher elevation than a lower component in a given orientation, but these terms can change if the device is flipped. The terms "inlet" and "outlet" are relative to a fluid flowing through them with respect to a given structure, e.g. a fluid flows through the inlet into the structure and flows through the outlet out of the structure. The terms "upstream" and "downstream" are relative to the direction in which a fluid flows through various components, i.e. the flow of fluids through an upstream component prior to flowing through the downstream component.

The terms "horizontal" and "vertical" are used to indicate direction relative to an absolute reference, i.e. ground level. However, these terms should not be construed to require structure to be absolutely parallel or absolutely perpendicular to each other. For example, a first vertical structure and a second vertical structure are not necessarily parallel to each other. The terms "top" and "floor" or "base" are used to refer to locations/surfaces where the top is always higher than the floor/base relative to an absolute reference, i.e. the surface of the Earth. The terms "upwards" and "downwards" are also relative to an absolute reference; an upwards flow is always against the gravity of the Earth.

The term "directly," wherein used to refer to two system components, such as valves or pumps, or other control devices, or sensors (e.g. temperature or pressure), may be located in the path between the two named components.

In the chemical pulping industry, mill operators treat lignocellulosic material with either strong acids or strong bases to disassociate the lignin from the cellulosic fibers. Operators may then separate, wash, and further process the cellulosic fibers into pulp or other pulp-based products. Chemical process examples include: the Kraft process (also known as the "sulfate process"), the sulfite process, the soda pulping process, and the sulfite semi-chemical pulping process.

While the processing chemicals for each type of chemical process may vary, mill operators frequently recover and recycle these process chemicals to operate the mill economically. For example, in the Kraft process, mill operators digest lignocellulosic material (commonly wood chips) in large pressurized vessels with "white liquor" comprising sodium hydroxide (NaOH) and sodium sulfide ($Na_2S$). During the digestion step, the white liquor reacts with lignin and other compounds in the lignocellulosic material and takes on a dark color. Unsurprisingly, this reacted liquor is known as "black liquor." Whereas the white liquor comprises the reactants sodium hydroxide (NaOH) and sodium sulfide ($Na_2S$), the black liquor contains the chemical products sodium carbonate ($Na_2CO_3$) and sodium sulfate ($Na_2SO_4$). While sodium hydroxide (NaOH) and sodium sulfide ($Na_2S$) are generally inexpensive, it is generally cost prohibitive to purchase new solutions of sodium hydroxide (NaOH) and sodium sulfide ($Na_2S$) to maintain production. For this reason, many chemical pulp mills use pyrolytic chemical recovery systems to recycle at least a portion of the produced sodium carbonate ($Na_2CO_3$) and sodium sulfate ($Na_2SO_4$). Converting these products back into the commercially useful chemical reactants, sodium hydroxide (NaOH) and sodium sulfide ($Na_2S$), allows mills to run economically.

New black liquor from a chemical digester is generally dilute and non-combustible. Therefore, to prepare black liquor for pyrolysis, operators generally funnel the black liquor through flash tanks or other evaporation steps to concentrate the solid particles in the black liquor. Operators then heat and inject the concentrated black liquor into a chemical recovery boiler. The recovery boiler evaporates the remaining water from the black liquor droplets and the solid compounds in the black liquor undergo partial pyrolysis. The remaining inorganic compounds fall to the bottom of the furnace and accumulate in a char bed. Some of the carbon and carbon monoxide in the char bed acts as a catalyst to convert most of the sodium sulfate ($Na_2SO_4$) into sodium sulfide ($Na_2S$). The sodium sulfide ($Na_2S$) then exits the recovery boiler with the sodium carbonate ($Na_2CO_3$) as liquid smelt.

This smelt flows through one or more smelt spouts at the bottom of the recovery boiler. Coolant, usually water, may cool the smelt spouts. Operators typically collect the green liquor and transport the green liquor to a causticizing plant to react the sodium carbonate ($Na_2CO_3$) with lime (CaO) to convert the sodium carbonate ($Na_2CO_3$) into sodium hydroxide (NaOH) and thereby reproduce the white liquor.

As the smelt contacts the green liquor in a dissolving tank, the smelt explodes and emits a series of audible sounds. This is generally known as "banging" by those in the industry. The smelt flowing from the spout is typically between 750° C. to 820° C., while the average temperature of the green liquor is about 70° C. to 100° C. Without being bound by theory, it is believed that the large temperature difference may increase the reactivity of the smelt and green liquor and thereby cause or contribute to banging. If left unregulated, a sudden influx of smelt may cause an explosion in the dissolving tank and recovery boiler, which poses grave safety risks to nearby operating personnel.

To manage smelt dissolution and to avoid excessive noise and the possibility of catastrophic explosions, conventional dissolving tanks generally disrupt the smelt as the smelt falls from the spout. Disruptors may be one or more shatter jets. A shatter jet blasts the falling smelt with steam or other shattering fluid at high pressure to create smelt droplets. These droplets collectively have a greater surface area than an undisrupted smelt flow. The individual droplets also have a smaller volume than an overall undisrupted smelt flow. The increased surface area and smaller amounts of reactants allows for banging explosions that are generally less intense than the explosions would be if the smelt contacted the green liquor as a continuous, uninterrupted, undisrupted flow. Typically, the end of the spout is elevated above the liquid level of green liquor and the shatter jets disrupt falling smelt as the smelt falls from the spout end. The shatter jet nozzles cannot be adjusted remotely. When a smelt upset occurs, operators generally cannot safely adjust the discharge rate of disrupting fluid into the dissolving tank.

Occasionally, smelt may cool prematurely in the recovery boiler or spout and decrease or eliminate the smelt flow rate. In this antediluvian state, liquid smelt tends to accumulate behind the obstruction. If the obstruction dislodges, the sudden smelt influx may overwhelm the shatter jet's ability to disrupt the smelt into sufficiently small droplets and an agitator's ability to mix the influx into the green liquor effectively. Moreover, if the deluge is particularly substantial, the smelt may flow over the sides of the spout and bypass the shatter jets entirely. In other scenarios, a shatter jet or agitator may fail. In these situations, the increased volume of smelt contacting the green liquor drastically increases the banging's explosive intensity and explosion risk.

In many mills, operators commonly move in and amongst the processing equipment to monitor process conditions and output. An explosion in the dissolving tank or recovery boiler poses a serious safety risk to personnel in the immediate vicinity, and the resulting fire poses a serious risk to personnel in the rest of the mill. Such explosions also cause an unregulated amount of pollutants to enter the air and groundwater and predicate significant production loss. Explosions of this scale can inactivate a mill for weeks to months.

FIG. 1 depicts a recovery boiler 102 having a smelt spout 105 adjacent to a dissolving tank 135. The smelt spout 105 directs a volume of smelt 110 into the dissolving tank 135. A typical recovery boiler 102 may have between three and six smelt spouts 105 disposed around the bottom of at least one side of the recover boiler 102 for example. Some recovery boilers 102 have smelt spouts 105 on oppositely disposed sides. As seen in the cutaway, the dissolving tank 135 contains a dissolving liquid 130. The dissolving liquid 130 is commonly green liquor. The liquid level 125 of the dissolving liquid 130 is generally below the top 134 of the dissolving tank 135. A primary agitator 140 driven by a motor M agitates the dissolving liquid 130 and helps equalize the dissolving liquid's temperature. The motor M may be a variable speed drive motor. Although the primary agitator 140 depicted in FIG. 1 is a propeller 141 connected to a driveshaft 142, it will be understood by those having ordinary skill in the art that an "agitator" is a device configured to move dissolving liquid 130 through the dissolving tank 135. Other agitators may include for example, fluid jets 136, devices that undulate the dissolving liquid 130, and other rotating bodies.

Primary agitators 140 typically comprise a propeller 141 or other mechanical implement extending into the dissolving liquid 130. Secondary agitators (see 136) may be fluid jets 136 that inject air or other fluid into the dissolving liquid 130 to agitate the dissolving liquid 130. While it is possible to use secondary agitators (see 136) simultaneously with primary agitators 140, operators more commonly activate secondary agitators (see 136) when primary agitators 140 fail or underperform. As the volume of smelt 110 falls from the spout 105, a disruptor 115, for example, a "shatter jet," directs a pressurized disrupting fluid 117 (commonly in the form of steam) toward the falling smelt 110. The disrupting fluid 117 interrupts the continuous smelt stream 110 and thereby creates smelt droplets 120. While shatter jets are common types of disruptors 115, it will be understood that other devices that break up or dropletize the smelt stream 110 falling form the spout 105 is a "disruptor" 115.

After the smelt droplets 120 contact the dissolving liquid 130, the smelt droplets 120 emit an audible bang and eventually dissolve into the dissolving liquid 130. In an upset condition, the amount of undissolved smelt in the dissolving tank 135 increases. When the amount of undissolved smelt increases in the dissolving tank 135 due to an increased flow rate, the incoming smelt stream 110 can overwhelm a disruptor's ability to shatter the smelt stream 110 into sufficiently small smelt droplets 120. Without being bound by theory, it is believed that the vast differences in temperatures between the volume of smelt 110 and the dissolving liquid 130 causes the smelt droplets 120 to explode soon after contacting the dissolving liquid 130.

An operator 101 is included in FIG. 1 to show the approximate scale of a person relative to the recovery boiler 102 and dissolving tank 135. Process conditions frequently change in a recovery boiler 102. For example, boiler load and falling salt cake from the top of the recovery boiler can change the rate of smelt flow and the position of the smelt flow relative to the disruptor. To ensure that the disruptor 115 is still dropletizing the smelt flow effectively, operators traditionally manually adjusted the position of the disruptor including the angle of the disruptor and the extent to which the disruptor 115 extends into the hood 103 of the dissolving tank 135. In addition, operators 101 could manually adjust the rate at which disruptor fluid 117 emanated from the disruptor 115.

Figure 2:
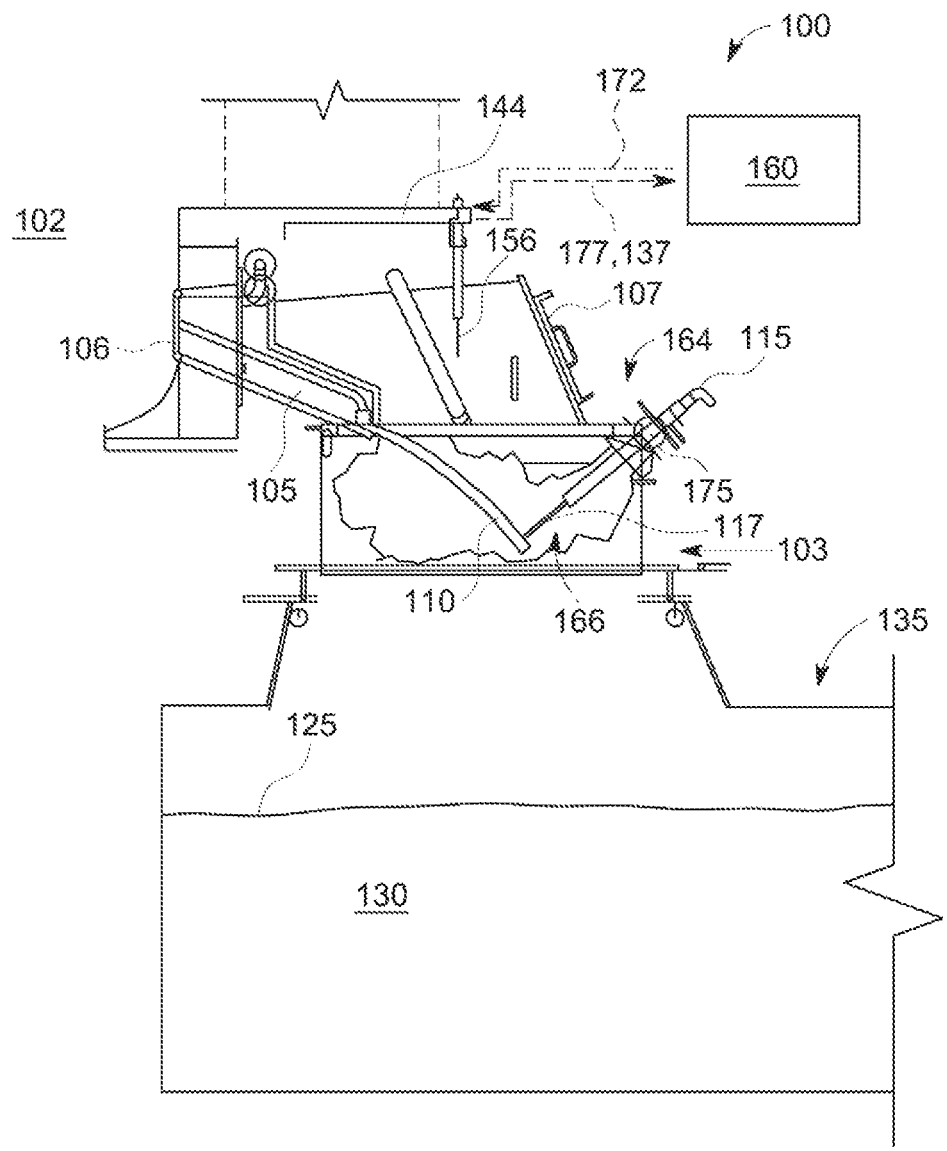
FIG. 2 is a close up side view of an exemplary disruptor adjustment system, depicting a cross-section of the dissolving tank and hood.
Figure 3:
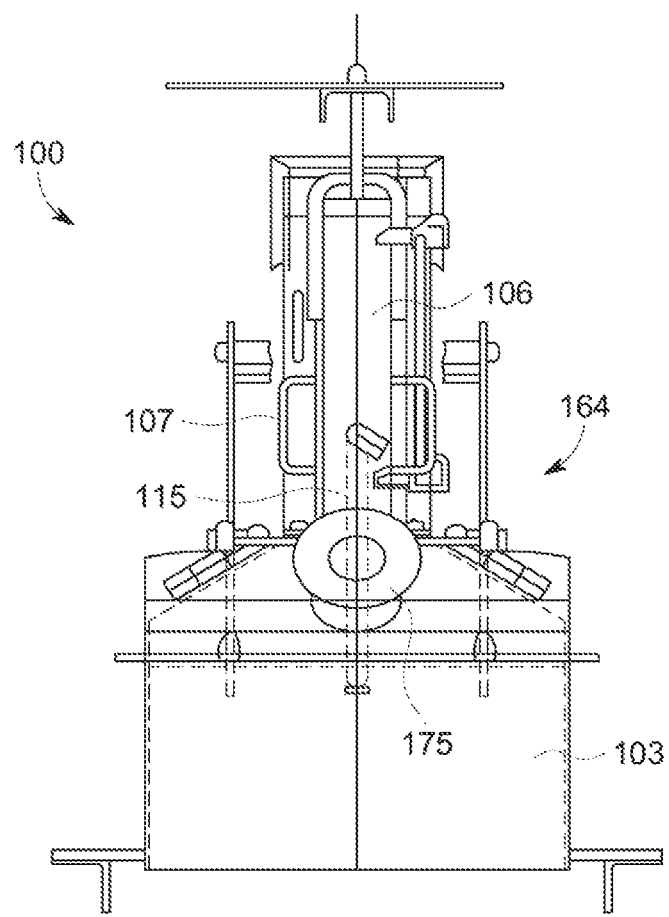
FIG. 3 is a facing view of an exemplary disruptor adjustment system.

Manual disruptor adjustment poses a significant safety risk. For example, the temperature inside the recovery boiler 102 typically ranges from about 1000° C. to about 1250° C. when fully operational. Windboxes 116 feed a near constant flow of air into the recovery boiler 102 to maintain combustion. To facilitate efficient pyrolysis, operators tend to try to create a cyclone of airflow into the recovery boiler 102. As seen in FIGS. 2 and 3, the spout opening 106 extends directly into the inside of the recovery boiler 102. The turbulent conditions of the recovery boiler 102 occasionally emit superheated gases from the spout openings 106.

As FIG. 1 illustrates, the spout opening 106 is frequently aligned with the inspection door 107 in the dissolving tank hood 103. To protect a proximate operator 101, the inspection door 107 may be closed during recovery boiler operation. When an operator is not present, the inspection door 107 can be open. Some mills aim cameras through the open inspection door 107 to monitor the smelt flow 110. However, if the operator 101 intends to make manual adjustments, the operator typically opens to inspection door 107 between adjustments to evaluate how effectively the disrupting fluid 117 is hitting the smelt falling from the smelt spout 105. While this inspection door is open, the operator 101 risks being exposed to unpredictable jets of superheated gas emanating from the spout opening 106. Furthermore, these gas jets may eject drops of molten 750° C. to 820° C. smelt 110 onto the operator 101. The operator 101 is therefore at significant risk of bodily injury when adjusting the disruptor manually. Additionally, the placement of other equipment proximate to the disruptor 115 may limit the operator's range of motion while adjusting the operating conditions 123 of the disruptor 115 and may motivate the operators to position his or her body in a precarious position at the risk of falling or incurring other injuries.

Furthermore, a typical recovery boiler 102 may have wall width of about 30 feet to about 40 feet for example and have about three to about six smelt spouts. 105 The process conditions within a recovery boiler 102 change constantly, yet it can take the average operator about 30 minutes on average to adjust all disruptors 115 manually, thereby increasing the operator's exposure to safety risks while also failing to maintain the operating conditions 123 (FIG. 4) of the disruptor 115 in response to the dynamic changes in smelt flow and in the smelt's physical and chemical properties.

To mitigate this problem, an exemplary embodiment of a recovery boiler dissolving tank disruptor adjustment system 100 is provided. FIG. 2 depicts such an exemplary embodiment comprising: a dissolving tank 135, a smelt spout 105 adjacent to the dissolving tank 135, wherein the smelt spout 105 is configured to convey a volume of smelt 110 into the dissolving tank 135. A disruptor 115 is configured to disrupt the volume of smelt 110 flowing from the smelt spout 105 into the dissolving tank 135. A sensor 156 is configured to record process data 137 from a recovery boiler 102, and a control system 160 is configured to receive a sensor output signal 177 from the sensor 156, wherein the sensor output signal 177 indicates the process data 137 at a measured time T, wherein the control system 160 is further configured to compare the sensor output signal 177 to a programmed operation range for a process condition, and to send a disruptor input signal 172 to the disruptor 115 to adjust a disruptor operating condition 123 if the process data 137 is outside of the programmed operation range.

In certain exemplary embodiments, the sensor 156 contains a signal generator 163 (FIG. 6) configured to generate the sensor output signal 177. In other exemplary embodiments, the signal generator 163 is separate from the sensor 156.

In certain exemplary embodiments, an actuator 175 is operatively engaged to the disruptor 115, wherein the actuator 175 is configured to adjust a position of the disruptor 115 in response to a disruptor input signal 172.

For the purposes of this disclosure, the position of the disruptor 115 is a disruptor operating condition 123. The position of the disruptor 115 can comprise an insertion depth. In other exemplary embodiments, the position of the disruptor 115 can comprises an angle of the disruptor 115. In still other exemplary embodiments, the position of the disruptor 115 comprises both the insertion depth of the disruptor in the hood 103 of the dissolving tank 135 and the angle of the disruptor 115. For the purposes of this disclosure, a "disruptor operating condition" 123 can be a rate of disrupting fluid flow.

In certain exemplary embodiments, the process data 137 is selected from the group consisting of: a rate of smelt flow, dissolving tank operational data, and a smelt spout cooling water temperature.

In certain exemplary embodiments, the system may further comprise a camera configured to capture an image of the smelt 110 in the smelt spout 105.

Another exemplary embodiment is a disruptor adjustment system 100 comprising: a disruptor assembly 164 configured to disrupt a volume of smelt 110 flowing from a smelt spout 105 into the dissolving tank 135, wherein the disruptor assembly 164 comprises an actuator 175 operatively engaged to a disruptor 115, a sensor 156 configured to record process data 137 from the recovery boiler 120; and a control system 160 configured to receive a sensor output signal 177 from the sensor 156, wherein the sensor output signal 177 indicates the process data 137 at a measured time T, wherein the control system 160 is further configured to compare the sensor output signal 177 to a programmed operation range, and to send a disruptor input signal 172 to the disruptor assembly 164 to adjust a disruptor operating condition 123 if the process data 137 of the sensor output signal 177 is outside of the programmed operation range.

In certain exemplary embodiments, the actuator 175 is configured to adjust a position of the disruptor 115 in response to a disruptor input signal 172.

In yet another exemplary embodiment of an exemplary system, the control system 160 is further configured to receive a disruptor output signal 173 indicating the disruptor output, wherein the control system 160 is further configured to send an agitator input signal 176 to an agitator 140 to adjust the rate of agitation when the disruptor output signal 173 indicates that the disruptor output is at a maximum and when the sensor output signal 177 indicates that the process data 137 is outside of the programmed operation range.

An exemplary system can further comprise multiple sensors 156 disposed in, on, or around the recovery boiler 102, wherein the multiple sensors 156 are configured to measure multiple process data types.

Process data 137 may come from the following sources for example: temperature of the smelt spout cooling water, temperature of the dissolving tank vent stack, dissolving tank operational data (such as dissolving tank noise, and smelt flow position from the smelt spout), digital data that quantifies smelt flow and/or velocity of the smelt exiting the smelt spout 115, digital data quantifying smelt inventory in the recovery boiler 102 (such as volume, location, etc.), and chemical characteristics of the smelt 110. Combinations of any of these types of process data 137 is considered to be within the scope of this disclosure. Other process data from a chemical recovery mill that can be correlated to smelt flow are considered to be within the scope of this disclosure.

In an exemplary embodiment, the process data 137 is the temperature for the smelt spout cooling water that exits the smelt spout 105. This is known as the outlet temperature of the smelt spout cooling water. A high outlet temperature of the cooling water could indicate a heavy smelt flow. An exemplary control system 160 as described herein is configured to adjust one or more disruptor operating conditions to mitigate the deviations in the smelt flow. A low outlet temperature of the cooling water could indicate a low smelt flow for example.

In other exemplary embodiments, the process data 137 is the temperature measured from the dissolving tank vent stack. A high vent stack temperature could indicate a heavy smelt flow. A low vent stack temperature could indicate a low smelt flow. In exemplary embodiments where the process data 137 is dissolving tank operational data, increased noise, or "banging" could indicate poor disruptor position and/or heavy smelt flow. In embodiments wherein digital data quantifies smelt flow and/or the velocity of smelt 110 exiting the smelt spout 105, a high velocity indicates a high smelt flow, whereas a lower velocity indicates a lower smelt flow. In embodiment wherein the digital data quantifies the smelt inventory in the recovery boiler 102 (e.g. the volume, location of the smelt bed, etc.) a high volume could indicate that a heavy smelt flow is forthcoming.

Figure 8:
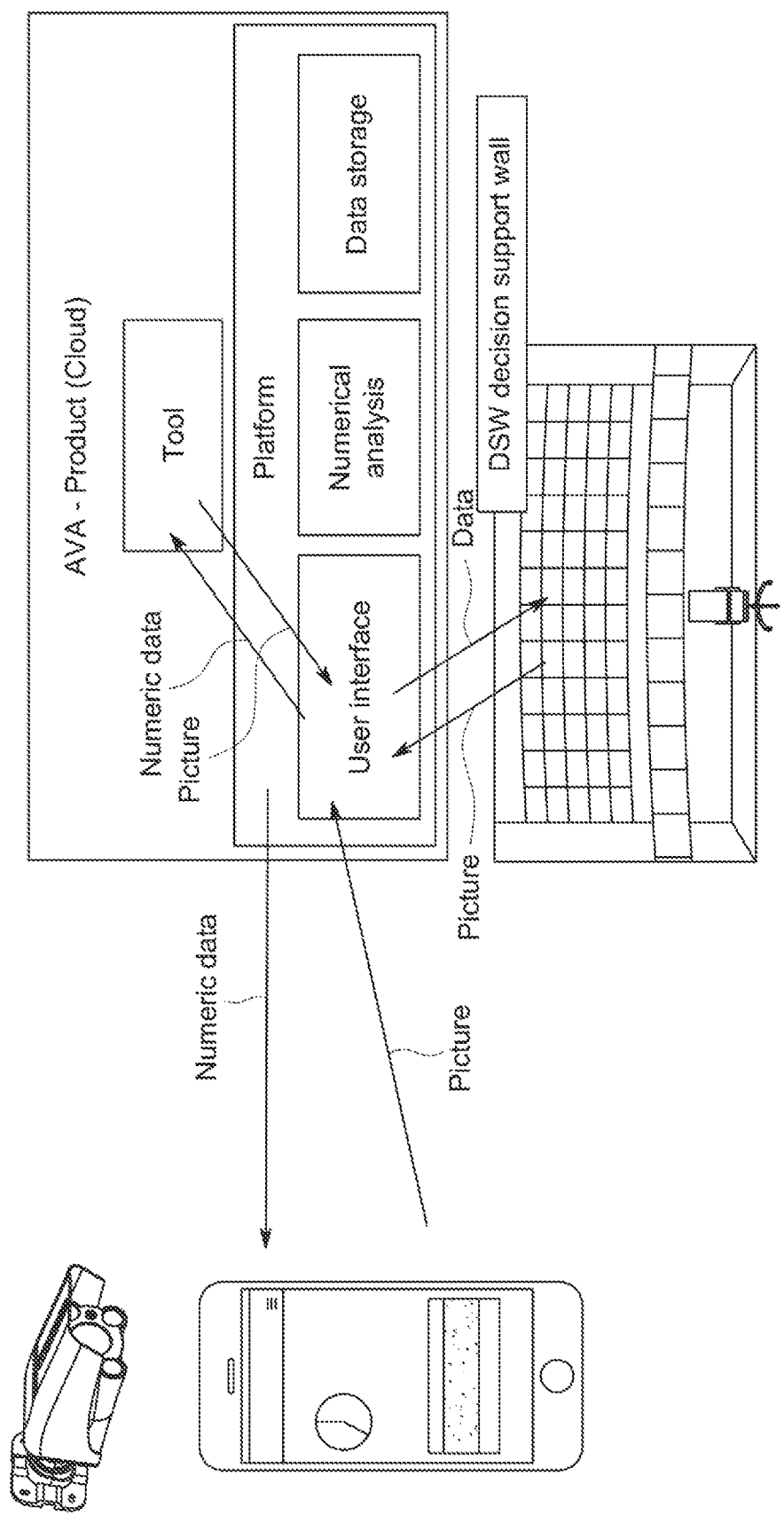
FIG. 8 is a block diagram depicting an exemplary disruptor adjustment system.

Digital data can come from a visual analysis system. In one such exemplary embodiment, a camera can be aimed through an open inspection door 107 to record the flow of smelt 110 from the spout 105. Referring to FIG. 8, the camera or other image capture device can record pictures or video and transmit the pictures or video to a control system comprising a platform. The platform can comprise a user interface, a module for performing numerical analysis, and a data storage module. The user interface can be a mobile device for example (such as a smart phone, tablet, or laptop for example) or a monitor (such as in a control center for example). The digital data (i.e. a type of process data 137) is relayed to the control system. The control system further comprises a tool for analyzing the picture of video to quantify the process data. For example, the analysis tool can quantify the percentage of sulfate, unburned material, and sulfite in a given sample. The control system can then store the analysis results in a data module, use a numerical analysis module to further analyze the results and calculate historical trends, and display the results (i.e. numeric data) on the user interface for remote operator review. In certain exemplary embodiments, the operator can then remotely adjust a disruptor operating condition 123 in response to results displayed on the user interface. In other exemplary embodiments, the control system can suggest changes to the remote operator. In such embodiments, the remote operator initiates the sending of the disruptor input signal 172 to adjust an operating condition 123 of the disruptor 115 in response to certain process data 137. In yet other exemplary embodiments, the control system can send a disruptor input signal 172 to the disruptor assembly 164 to adjust a disruptor operating condition 123 without remote operator review.

In embodiments in which the process data 137 is one or more chemical characteristics of smelt (sulfidity, etc.) a low sulfidity increases the viscosity and the melting temperature of smelt, thereby often leading to a lower angle of smelt flow. By contrast, a high sulfidity deceases smelt viscosity to a point. An exemplary system 100 as described herein is configured to adjust one or more disruptor operating conditions to mitigate the deviations in smelt flow.

In certain exemplary embodiments, multiple disruptors 115 are disposed above the dissolving tank 135. In certain exemplary embodiments, an operator may adjust the disruptor 115 remotely based upon visual inputs from a sensor 156, in such embodiments, the sensor is likely to be a camera.

Another exemplary disruptor adjustment system 100 comprises: a disruptor assembly 164 configured to disrupt a volume of smelt 110 flowing from a smelt spout 105 into the dissolving tank 135, wherein the disruptor assembly 164 comprises an actuator 175 operatively engaged to a disruptor 115, a sensor 156 configured to record process data 137 from the recovery boiler 102, and a control system 160 configured to receive a sensor output signal 177 from the sensor 156, wherein the sensor output signal 177 indicates the process data 137 at a measured time T, wherein the control system 160 is further configured to compare the sensor output signal 177 to a programmed operation range for the process data 137, and to send a disruptor input signal 172 to disruptor assembly 164 to change a first disruptor operating condition 123 to a second disruptor operating condition 123 if the sensor output signal 177 is outside of the programmed operation range.

Sensors 156 may be disposed in or around the dissolving tank 135 or in or around the recovery boiler 102 to monitor process conditions. The signal generators 163 typically associated with the sensors 156 generate a sensor output signal 177 and transmit the sensor output signal 177 to the control system 160. The control system 160 in turn is configured to adjust a disruptor operating condition 123 based on the value of the sensor output signal 177. Other "process conditions" may include, for example, temperature of the recovery boiler, temperature of the dissolving liquid 130, acoustic emissions from the banging, and the density of the dissolving liquid 130.

In certain exemplary embodiments, the control system 160 may be selected from the group consisting of a computer, a programmable logic controller ("PLC"), a field programmable gate array ("FPGA"), an application-specific integrated circuit ("ASIC"), or other processor.

In the depicted exemplary embodiment, the control system 160 is in signal communication with the disruptor assembly 164, the sensors 156, and optionally, the primary agitator 140. Signal communication may be achieved through wires or wirelessly. It is further contemplated that "signal communication" may comprise the use of one or more intermediate signal processors (e.g. amplifiers, analog to digital converters, relays, filters, etc.) configured to modify and/or transmit the signals between the control system 160 and the disruptor assembly 164, the sensors 156, and optionally, the primary agitator 140. Combinations of any of the disclosed embodiments are within the scope of this disclosure.

As an example of an exemplary method, the control system 160 may receive a disruptor output signal 173 from a disruptor 115 and a sensor output signal 177 from a sensor 156. The disruptor output signal 173 may indicate that the disruptors 115 are emitting disrupting fluid 117 at a maximum flow rate. The sensor output signal 177 may indicate that the density of the dissolving liquid 130 is above the desirable range. The control system 160 may analyze the signals 173, 177 and send an agitator input signal 176 to the agitator (see 140, 136) to increase the rate of agitation. A nominal range for the density of the dissolving liquid 130 is typically between 1,100 kilograms per meter cubed ("kg/m$^3$") and 1,180 kg/m$^3$. If the sensor 156 is a temperature sensor, the desirable or "nominal" temperature range for the dissolving liquid 130 if the dissolving liquid 130 is green liquor is about 70° C. to 100° C.

Figure 4:
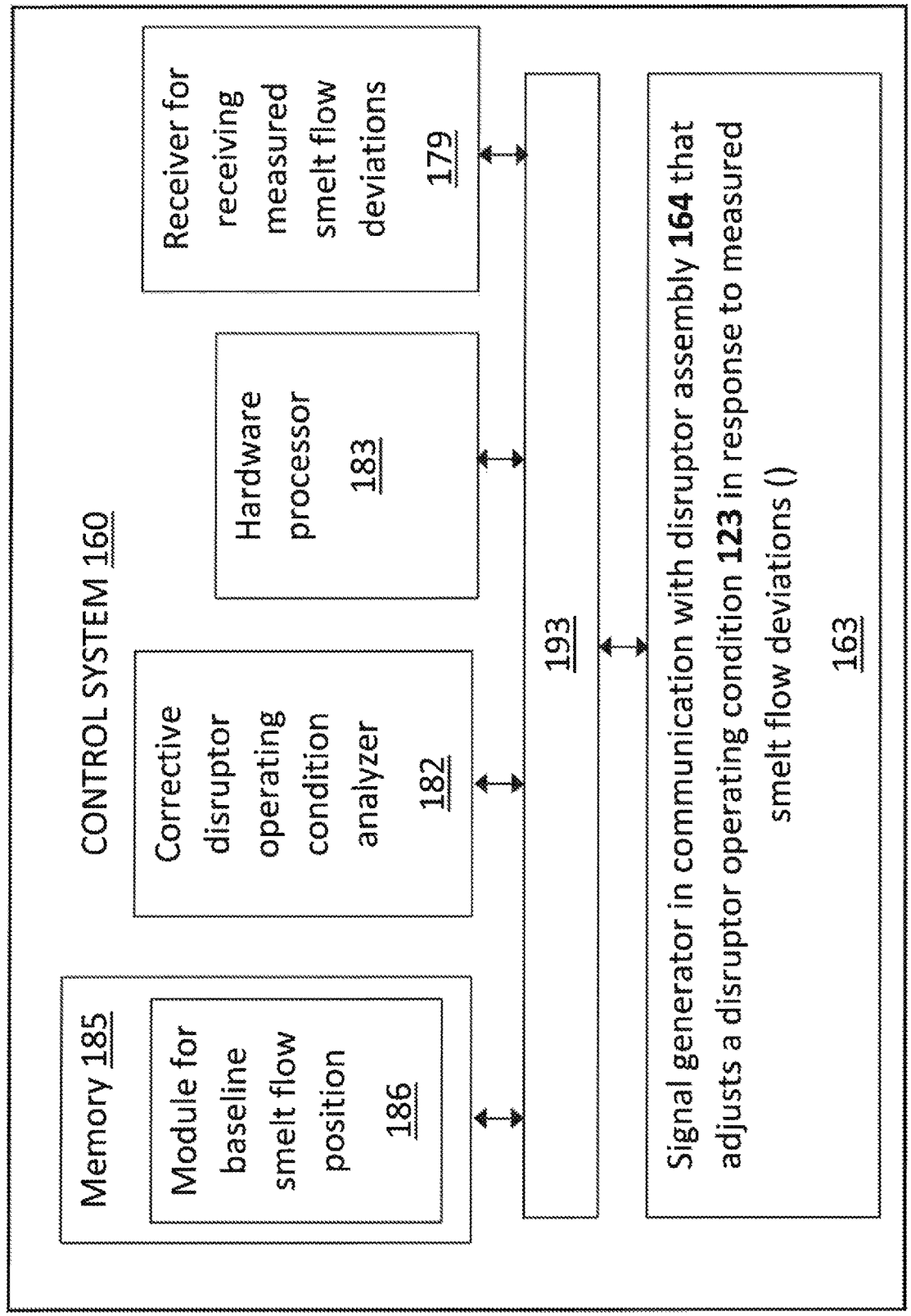
FIG. 4 is a block diagram depicted a first embodiment of a control system in accordance with the present disclosure for adjusting a disruptor operating condition in response to smelt flow deviations.
Figure 5:
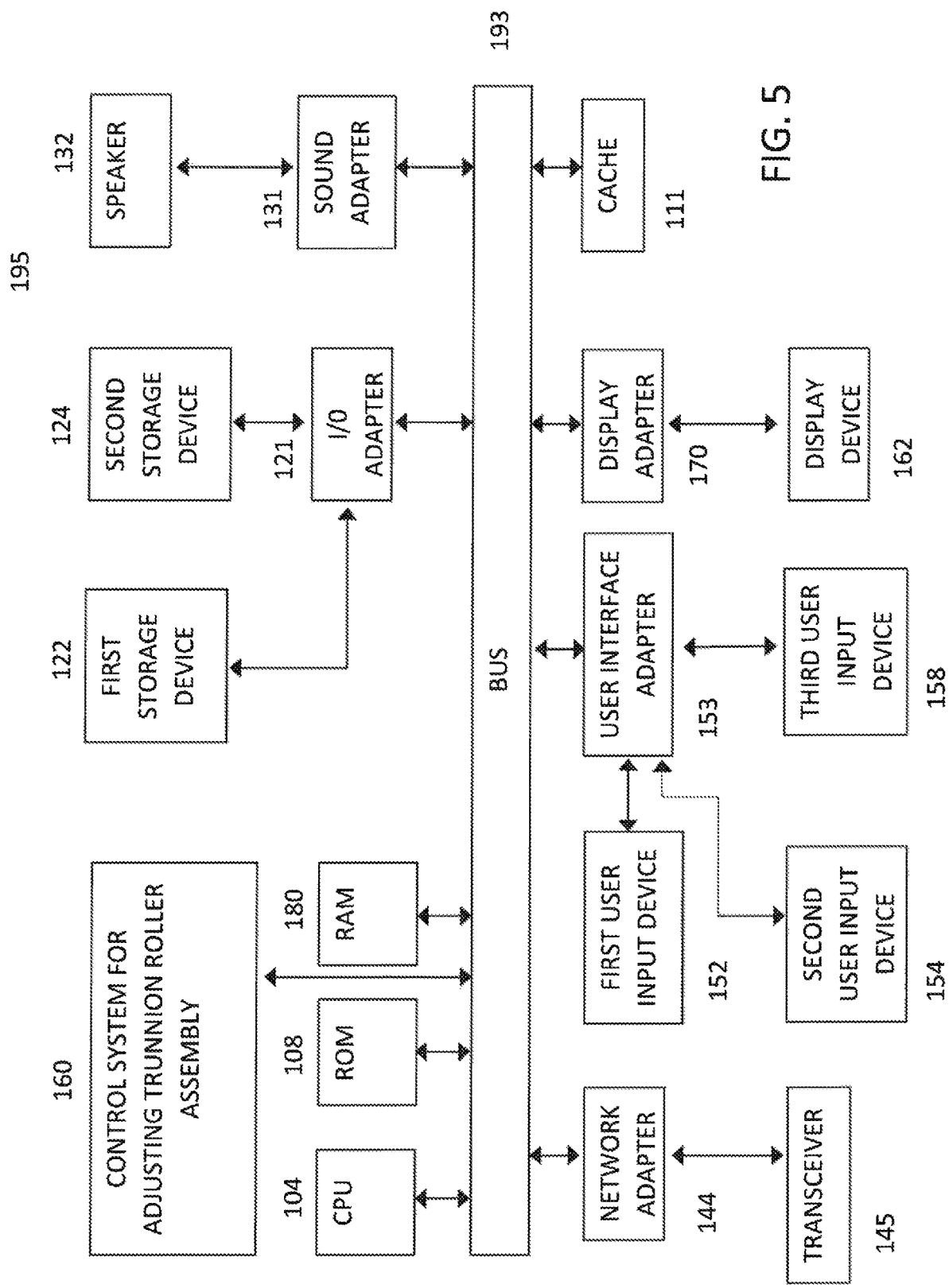
FIG. 5 is a block diagram illustrating a system that can incorporate the control system for adjusting a disruptor operating condition that is depicted in FIG. 4, in accordance with one exemplary embodiment of the present disclosure.

FIGS. 4 and 5 depict one embodiment of a control system 160 for adjusting a disruptor operating condition 123 to mitigate the effects of smelt flow variations.

The control system 160 is in communication with the disruptor adjustment systems 100 that have been described above with reference to FIGS. 2-3. For example, the control system 160 may include at least one signal generator 163 in communication with disruptor adjustment systems 100 that adjusts a disruptor operating condition 123 in responses to changes in smelt flow characteristics. In one embodiment, the at least one signal generator 163 is in communication with the disruptor assembly 164.

In some embodiments, the control system 160 may include a receiver 179 for receiving measured smelt flow deviations between the smelt flow and the emission end 166 of the disruptor 115.

In some embodiments, the control system 160 may further include a corrective disruptor operating condition analyzer 182 that employs a hardware processor 183 for performing a set of instructions for comparing the smelt flow deviations to the baseline smelt flow position values in providing a corrective disruptor operating condition dimension. As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

More specifically, in an exemplary embodiment, the control system 160 receives data measured on the smelt flow position relative to the disruptor position from a sensor 156, which can measure the smelt flow position during operation. The control system 160 then employs the corrective disruptor operating condition analyzer 182 to compare the data measured on the smelt flow position from the sensor 156 to the baseline smelt flow position 157 that was previously determined in step 1 of the method depicted in FIG. 7. The baseline smelt flow position values may be stored in the memory 185 of the control system 160, which can be provided in a module for baseline smelt flow position 186. In some embodiments, the corrective disruptor operating condition analyzer 182 determines if the difference between the baseline smelt flow position 157 and the measured smelt flow is a deviation that is significant enough to be a smelt flow deviation from which the disruptor adjustment system 100 may benefit from a correction in a disruptor operating condition 123 actuated by the actuator 175 or by adjusting the rate of disrupting fluid dissemination. To determine if correction is suitable, the corrective disruptor operating condition analyzer 182 may employ a number of rules that are actuated by the hardware processor 183 in calculating a solution to smelt flow position deviations.

Each of the components for the control system 160 that are depicted in FIG. 4 may be interconnected via a system bus 193.

Any of the systems or machines (e.g., devices) shown in FIG. 4 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed above, and such a special-purpose computer may, accordingly, be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

The control system 160 may be integrated into the processing system 195 depicted in FIG. 5. The processing system 195 includes at least one processor (CPU) 104 operatively coupled to other components via a system bus 193. A cache 111, a Read Only Memory (ROM) 108, a Random Access Memory (RAM) 180, an input/output (I/O) adapter 121, a sound adapter 131, a network adapter 144, a user interface adapter 153, and a display adapter 170, are operatively coupled to the system bus 193. The bus 193 interconnects a plurality of components as will be described herein.

The processing system 195 depicted in FIG. 5, may further include a first storage device 122 and a second storage device 124 are operatively coupled to system bus 193 by the I/O adapter 121. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 193 by the sound adapter 131. A transceiver 145 is operatively coupled to system bus 193 by network adapter 144. A display device 162 is operatively coupled to system bus 193 by display adapter 170.

A first user input device 152, a second user input device 154, and a third user input device 158 are operatively coupled to system bus 193 by user interface adapter 153. The user input devices 152, 154, and 158 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention.

The user input devices 152, 154, and 158 can be the same type of user input device or different types of user input devices. The user input devices 152, 154, and 158 are used to input and output information to and from the processing system 195.

Of course, the processing system 195 may also include other elements (not shown), as readily contemplated by one of skill in the art, as well as omit certain elements. For example, various other input devices and/or output devices can be included in processing system 195, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 195 are readily contemplated by one of ordinary skill in the art given the teachings of the present invention provided herein.

Figure 6:
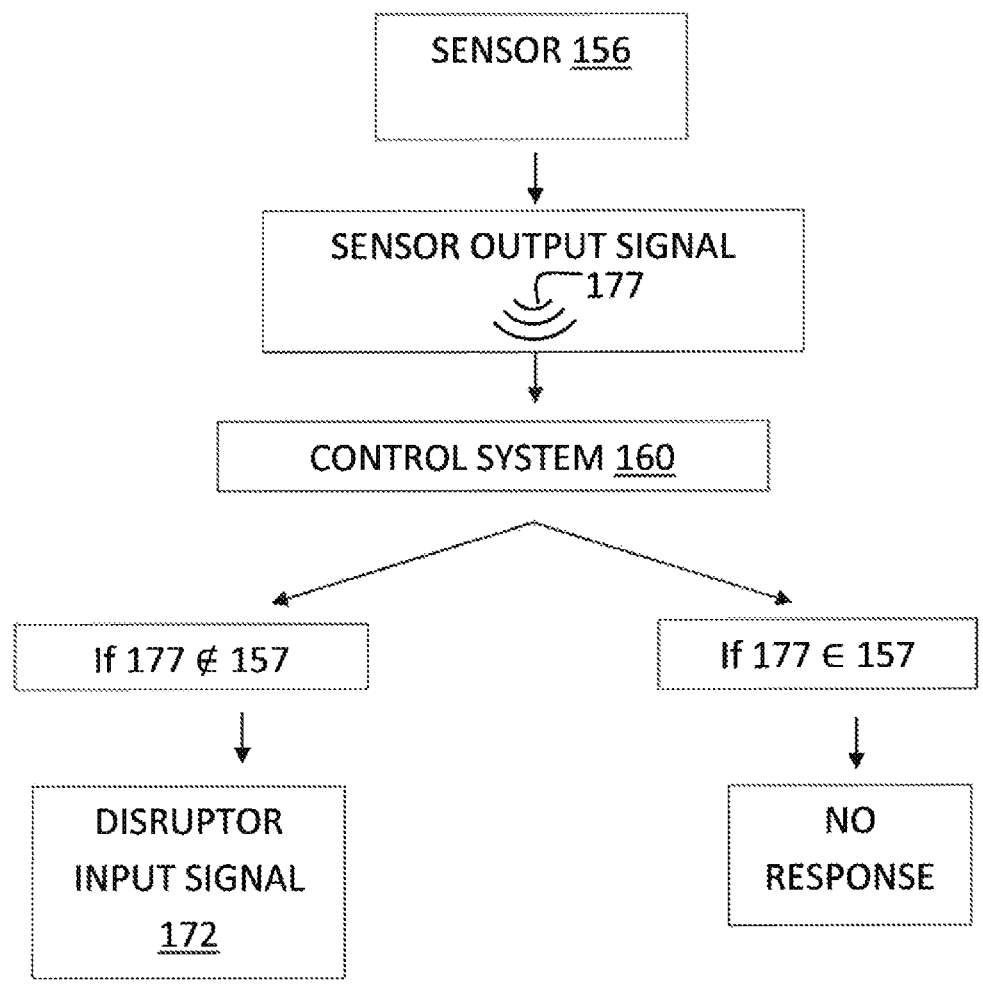
FIG. 6 is a flowchart depicting a possible signal path for the sensor output signal.

FIG. 6 is a flowchart depicting possible signal paths of the sensor output signal 177, which is measured by the sensor 156 in measuring process data 137, such as the position of the smelt flow relative to the disruptor 115. In operation, the sensor 156 measures the distance D of the smelt flow 110 to the disruptor 115 to generate a sensor output signal 177. The sensor 156 then transmits the sensor output signal 177 to the control system 160 that is configured to analyze the sensor output signal 177. The control system 160 may take a variety of forms physically, and may include by way of example, an integrated power and signal device, or separate power and signal processing devices connected together. The control system 160 may be digital or analog, and controlled by programmable logic controller ("PLC") logic or relay logic. In an exemplary embodiment, the control system 160 includes a corrective disruptor operating condition analyzer 182 that compares the value of the sensor output signal 177 to a baseline smelt flow position 157. The baseline smelt flow position 157 may include the values stored within the module for baseline smelt flow position 186 that can be stored in the memory 185 of the control system 160. The control system 160 can then send disruptor input signal 172 to the disruptor assembly 164 if the sensor output signal 177 differs (e.g. is not an element in) from the baseline smelt flow position 157. In one embodiment, if the sensor output signal 177 exceeds the baseline smelt flow position 157, the disruptor input signal 172 directs actuator 175 to change the angle of the disruptor 115 relative to the smelt flow 110. In another exemplary embodiment, if the sensor output signal 177 exceeds the baseline smelt flow position 157, the disruptor input signal 172 directs actuator 175 to change insertion depth of the disruptor 115 in the hood 103 relative to the smelt flow 110. In an exemplary embodiment, the disruptor 115 provides a redundant disruptor output signal 173 to the control system 160 to confirm the disruptor operating condition 123 of the disruptor 115.

The present invention may be a system, a method, and/or a computer program product at any possible technical detail level of integration. The computer program product can provide a method for maintaining a desirable position between an emission end 166 of a disruptor 115 and a smelt flow 110. The computer program product may include a computer readable storage medium (or media) having computer readable program instructions thereon for causing a processor to carry out aspects of the present invention. For example, the present disclosure provides a computer program product comprising a non-transitory computer readable storage medium having computer readable program code embodied therein. The computer readable program code can provide the steps of measuring a baseline smelt flow position 157 between at least one emission end 166 of a disruptor 115 and the smelt flow 110. An actuator 175 may be engaged to the at least disruptor 115.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
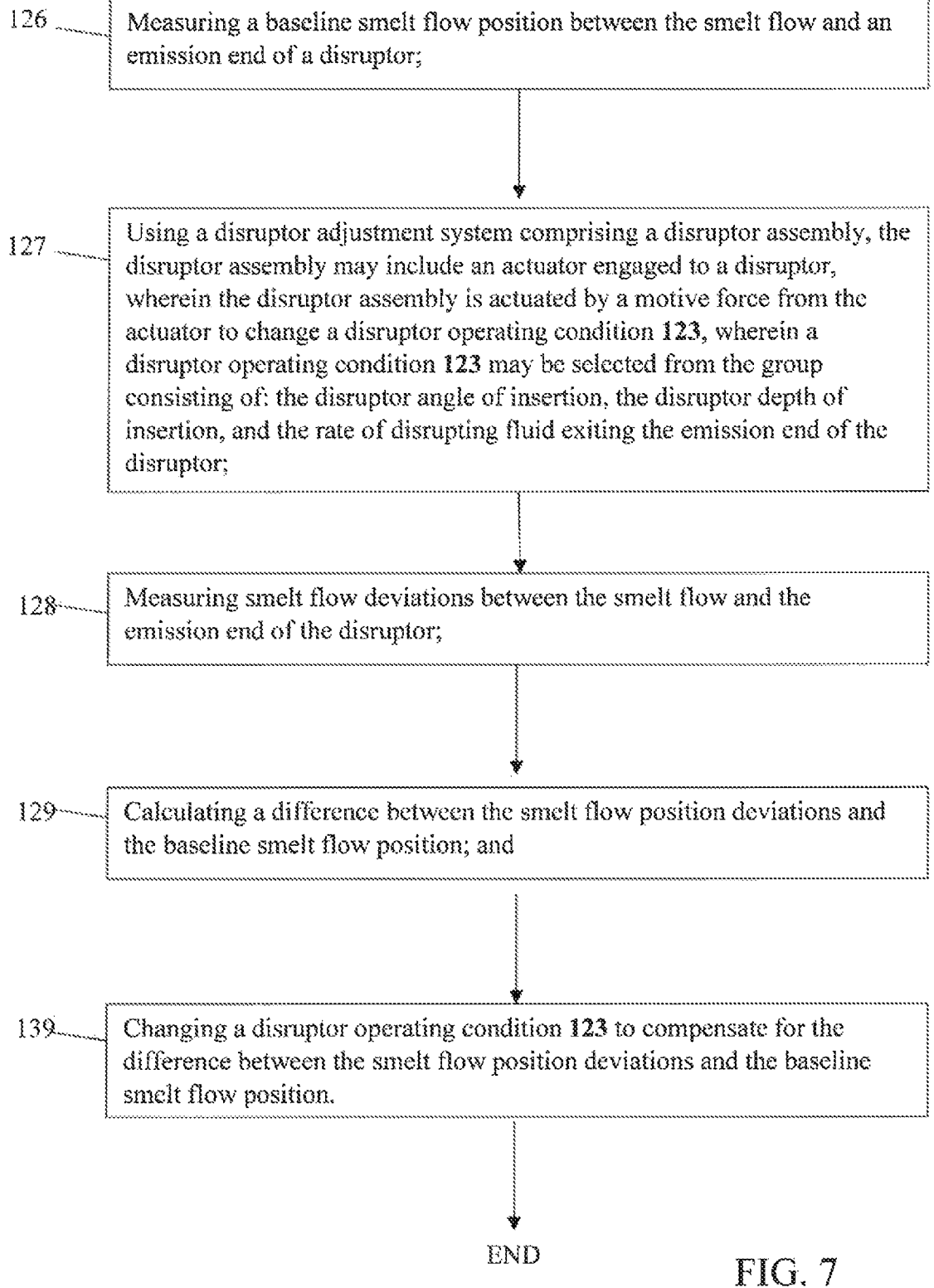
FIG. 7 is a flow diagram showing a method for adjusting a disruptor operating condition to mitigate variations is smelt flow position in accordance with one embodiment of the present disclosure.

FIG. 7 is a flow diagram showing a method for adjusting a disruptor operating condition 123 to mitigate the effects of variations in the smelt flow position 110, in accordance with one embodiment of the present disclosure. FIGS. 2-3 illustrate an exemplary disruptor adjustment system 100 that can be used in combination with the method described with reference to FIG. 7. FIGS. 4 and 5 illustrates some embodiments of a control system 160 for use with the structures and methods depicted in FIGS. 6-7.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring to block 126 of FIG. 7, in one embodiment, the method for maintaining a desirable disruption of the smelt flow 110 may begin with measuring a baseline smelt flow position between at least one disruptor emission end 166 and the smelt flow 110 pouring from the smelt spout 105 at desirable conditions. The boiler depicted here is a recovery boiler 102. However, the methods, systems and structures of the present disclosure are not limited to only this example. The methods, structures and systems described herein are applicable to any boilers that smelt spouts 115.

As used herein, the "smelt flow position" is a dimension between the smelt flow 110 and an emission end 166 of at least one disruptor 115. The smelt flow position is depicted in FIG. 2, in which the dimension for the smelt flow position is identified by D. The smelt flow position in the systems described herein may be continually measured, and compared to the "baseline smelt flow position". In some embodiments, the difference between the baseline smelt flow position and the measured smelt flow position provides the differential by which the disruptor 115 may be adjusted to provide for an optimized distance and angle between the emission end 166 of the disruptor 115 and the smelt flow 110. The baseline smelt flow position may take into account a mode of operation for the recovery boiler 102. For example, the baseline smelt flow position may be different for startup of the recovery boiler 102, when the recovery boiler 102 is processing reduced throughput of black liquor, when the recovery boiler is processing black liquor of different chemical compositions, when the recovery boiler is operating at capacity, and a combination of those factors. The baseline smelt flow position may also take into account different operational considerations of the disruptor 115, such as the throughput capacity of the disruptor 115.

Referring to FIG. 4, the baseline smelt flow position 186 may be stored in the memory 185 of a control system 160 for maintaining a desirable distance D and orientation between an emission end 166 of the disruptor 115 and the smelt flow 110. The control system 160 may also be referred to as the controller that receives a sensor output signal 177 from a sensor 156 measuring the position of the smelt flow 110 relative to the emission end 166 of the disruptor 115. The control system 160 can further adjust a disruptor operating condition 123 to compensate for the deviations in the smelt flow position. In one embodiment, the control system 160 may include at least one module of memory 186 for storing baseline smelt flow position values for a dimension between at least one disruptor 115 and the smelt flow 110.

The baseline smelt flow position values may be entered into the control system 160 by an operator that interfaces with the control system 160 over a user interface adapter 153, as depicted in FIG. 5. In this example, an operator of the recovery boiler 102 may enter values for the baseline smelt flow position from at least one input device 152, 154, 158. The at least one input device 152, 154, 158 may be any computing device, such as a desktop computer, mobile computer, laptop computer, tablet, smart phone and/or computer specific to the turbine.

The input devices 152, 154, 158 may be in connection with the user interface adapter 153 via a wireless connection, or the input devices 152, 154, 156 may be hard wired into electrical communication with the user interface adapter 153.

The baseline smelt flow position may be a value that is manually measured from the recovery boiler 102 during start up, or while the recovery boiler 102 is offline, and may also take into account measurements while the recovery boiler 102 is in operation.

In some other embodiments, the control system 160 may employ machine learning to adjust the baseline smelt flow position taking into account at least one of historical measurements for the smelt flow position, real time measurements of the smelt flow position and operator suggested values for the smelt flow position. Machine learning algorithms build a mathematical model based on sample data, known as "training data", in order to make predictions or decisions without being explicitly programmed to perform the task. In this case, the historical measurements may be employed with operation conditions to provide training data algorithms, which can in turn be employed to use real time data to update the baseline smelt flow position.

Referring to FIG. 7, the method may continue at block 127 using a disruptor adjustment system comprising a disruptor assembly, the disruptor assembly may include an actuator engaged to a disruptor, wherein the disruptor assembly is actuated by a motive force from the actuator to change a disruptor operating condition 123, wherein a disruptor operating condition 123 may be selected from the group consisting of: the disruptor angle of insertion, the disruptor depth of insertion, and the rate of disrupting fluid exiting the emission end 166 of the disruptor 115.

The method may further include Measuring smelt flow deviations between the smelt flow and the emission end 166 of the disruptor block 128. The method may continue with block 129 in further calculating a difference between the smelt flow position deviations and the baseline smelt flow position. In some embodiments, the calculation of the difference between the smelt flow position deviations and the baseline smelt flow position is provided by a control system 160, which can include a corrective disruptor operating condition analyzer 182. Referring to block 139 of FIG. 7, in some embodiments, the method includes changing a disruptor operating condition 123 to compensate for the difference between the smelt flow position deviations and the baseline smelt flow position.

An exemplary method for monitoring and adjusting a disruptor operating condition 123 for a disruptor 115 disposed over a dissolving tank 135 comprises: receiving a sensor output signal 177 from an sensor 156, the sensor output signal 117 indicating a process condition at a measured time T; receiving a disruptor output signal 173 from a disruptor assembly 164 disposed over a dissolving tank 135 indicating a current disruptor operating condition 123, comparing the sensor output signal 117 with a baseline smelt flow position for the process condition; comparing the disruptor output signal 173 with a baseline disruptor operating condition for the disruptor 115; and sending a disruptor input signal 172 to the disruptor 115 to adjust the disruptor operating condition 123 when the sensor output signal 177 is outside the desirable operation range for the process condition.

An exemplary recovery boiler dissolving tank disruptor adjustment system comprises: a dissolving tank, a spout adjacent to the dissolving tank, wherein the spout is configured to convey a volume of smelt into the dissolving tank, a disruptor configured to disrupt the volume of smelt flowing from the spout into the dissolving tank, a sensor configured to record process data from a recovery boiler, and a control system configured to receive a sensor output signal from the sensor, wherein the sensor output signal indicates the process data at a measured time, wherein the control system is further configured to compare the sensor output signal to a programmed operation range for the process condition, and to send a disruptor input signal to the disruptor to adjust a disruptor operating condition if the process data is outside of the programmed operation range.

An exemplary system may further comprise an actuator operatively engaged to the disruptor, wherein the actuator is configured to adjust a position of the disruptor in response to a disruptor input signal.

In certain exemplary embodiments, the position of the disruptor is a disruptor operating condition.

In certain exemplary embodiments, the position of the disruptor comprises an insertion depth.

In certain exemplary embodiments, the position of the disruptor comprises an angle of the disruptor.

In certain exemplary embodiments, the disruptor operating condition further comprises a rate of steam flow.

In certain exemplary embodiments, the process data is selected from the group consisting of: a rate of smelt flow, dissolving tank operational data, and a smelt spout cooling water temperature.

An exemplary system may further comprise a camera configured to capture an image of the smelt in the smelt spout.

An exemplary disruptor adjustment system comprises: a disruptor assembly configured to disrupt a volume of smelt flowing from a smelt spout into the dissolving tank, wherein the disruptor assembly comprises an actuator operatively engaged to a disruptor, a sensor configured to record process data from the recovery boiler, and a control system configured to receive a sensor output signal from the sensor, wherein the sensor output signal indicates the process data at a measured time, wherein the control system is further configured to compare the sensor output signal to a programmed operation range, and to send a disruptor input signal to the disruptor assembly to adjust a disruptor operating condition if the process data of the sensor output signal is outside of the programmed operation range.

In certain exemplary embodiments, the actuator is configured to adjust a position of the disruptor in response to a disruptor input signal.

In certain exemplary embodiments, the position of the disruptor is a disruptor operating condition.

In certain exemplary embodiments, the position of the disruptor comprises an insertion depth.

In certain exemplary embodiments, the position of the disruptor comprises an angle of the disruptor.

In certain exemplary embodiments, the disruptor operating condition further comprises a rate of steam flow.

In certain exemplary embodiments, the process data is selected from the group consisting of: a rate of smelt flow, dissolving tank operational data, and a smelt spout cooling water temperature.

An exemplary system may further comprise a camera configured to capture an image of the smelt leaving the smelt spout.

In certain exemplary embodiments, the control system is further configured to receive a disruptor output signal indicating the disruptor output, wherein the control system is further configured to send an agitator input signal to an agitator to adjust the rate of agitation when the disruptor output signal indicates that the disruptor output is at a maximum and when the sensor output signal indicates that the process data is outside of the programmed desirable range.

In certain exemplary embodiments, the control system is further configured to receive a transducer output signal indicating the transducer output, wherein the control system is further configured to send a disruptor input signal to the disruptor to adjust the rate of disruption when the transducer output signal indicates that the transducer output is at a maximum and when the sensor output signal indicates that the process condition is outside of the programmed desirable range.

An exemplary system may further comprise multiple sensors disposed in, on, or around the recovery boiler, wherein the multiple sensors are configured to measure multiple process data types.

An exemplary system may further comprise multiple disruptors disposed above the dissolving tank.

An exemplary disruptor adjustment system comprises: a disruptor assembly configured to disrupt a volume of smelt flowing from a smelt spout into the dissolving tank, wherein the disruptor assembly comprises an actuator operatively engaged to a disruptor; a sensor configured to record process data from the recovery boiler; and a control system configured to receive a sensor output signal from the sensor, wherein the sensor output signal indicates the process data at a measured time, wherein the control system is further configured to compare the sensor output signal to a programmed operation range for the process data, and to send a disruptor input signal to disruptor assembly to change a first disruptor operating condition to a second disruptor operating condition if the sensor output signal is outside of the programmed operation range.

An exemplary method for monitoring and adjusting a disruptor operating condition for a disruptor disposed over a dissolving tank comprises: receiving a sensor output signal from an sensor, the sensor output signal indicating a process condition at a measured time; receiving a disruptor output signal from a disruptor assembly disposed over a dissolving tank indicating a current disruptor operating condition; comparing the sensor output signal with a baseline smelt flow position for the process condition; comparing the disruptor output signal with a baseline disruptor operating condition for the disruptor; and sending a disruptor input signal to the disruptor to adjust the disruptor operating condition when the sensor output signal is outside the desirable operation range for the process condition.

An exemplary method may further comprise receiving an agitator output signal from an agitator indicating a rate of agitation, and sending an agitator input signal to the agitator to adjust the rate of agitation when the disruptor output signal is outside of the programmed desirable operation range for the disruptor.

An exemplary method may further comprise sending a sensor input signal to the sensor to adjust a sensitivity to the process condition.

While this invention has been particularly shown and described with references to exemplary embodiments thereof, it will be understood by those skilled in the art that various changes in form and details may be made therein without departing from the scope of the invention encompassed by the appended claims.

What is claimed is:

1. A recovery boiler dissolving tank disruptor adjustment system comprising:
    a dissolving tank;
    a spout adjacent to the dissolving tank, wherein the spout is configured to convey a volume of smelt into the dissolving tank;
    a disruptor configured to disrupt the volume of smelt flowing from the spout into the dissolving tank;
    a sensor configured to record process data from a recovery boiler; and a control system configured to receive a sensor output signal from the sensor, wherein the sensor output signal indicates the process data at a measured time, wherein the control system is further configured to compare the sensor output signal to a programmed operation range for the process condition, and to send a disruptor input signal to the disruptor to adjust a disruptor operating condition when the process data is outside of the programmed operation range.

2. The system of claim 1 further comprising an actuator operatively engaged to the disruptor, wherein the actuator is configured to adjust a position of the disruptor in response to a disruptor input signal.

3. The system of claim 2, wherein the position of the disruptor is a disruptor operating condition.

4. The system of claim 2, wherein the position of the disruptor comprises an insertion depth.

5. The system of claim 2, wherein the position of the disruptor comprises an angle of the disruptor.

6. The system of claim 1, wherein the disruptor operating condition further comprises a rate of steam flow.

7. The system of claim 1, wherein the process data is selected from the group consisting of:
a rate of smelt flow, dissolving tank operational data, and a smelt spout cooling water temperature.

8. The system of claim 1 further comprising a camera configured to capture an image of the smelt in the smelt spout.

9. A disruptor adjustment system comprising:
a disruptor assembly configured to disrupt a volume of smelt flowing from a smelt spout into a dissolving tank, wherein the disruptor assembly comprises an actuator operatively engaged to a disruptor;
a sensor configured to record process data from a recovery boiler; and
a control system configured to receive a sensor output signal from the sensor,
wherein the sensor output signal indicates the process data at a measured time, wherein the control system is further configured to compare the sensor output signal to a programmed operation range, and to send a disruptor input signal to the disruptor assembly to adjust a disruptor operating condition when the process data of the sensor output signal is outside of the programmed operation range.

10. The system of claim 9, wherein the actuator is configured to adjust a position of the disruptor in response to a disruptor input signal.

11. The system of claim 10, wherein the position of the disruptor is a disruptor operating condition.

12. The system of claim 10, wherein the position of the disruptor comprises an insertion depth.

13. The system of claim 10, wherein the position of the disruptor comprises an angle of the disruptor.

14. The system of claim 9, wherein the disruptor operating condition further comprises a rate of steam flow.

15. The system of claim 9, wherein the process data is selected from the group consisting of:
a rate of smelt flow, dissolving tank operational data, and a smelt spout cooling water temperature.

16. The system of claim 9 further comprising a camera configured to capture an image of the smelt leaving the smelt spout.

17. The system of claim 9, wherein the control system is further configured to receive a disruptor output signal indicating the disruptor output, wherein the control system is further configured to send an agitator input signal to an agitator to adjust a rate of agitation when the disruptor output signal indicates that the disruptor output is at a maximum and when the sensor output signal indicates that the process data is outside of the programmed operation range.

18. The system of claim 9, wherein the control system is further configured to receive a transducer output signal indicating the transducer output, wherein the control system is further configured to send a disruptor input signal to the disruptor to adjust a rate of disruption when the transducer output signal indicates that the transducer output is at a maximum and when the sensor output signal indicates that the process condition is outside of the programmed operation range.

19. The system of claim 9 further comprising multiple sensors disposed in, on, or around the recovery boiler, wherein the multiple sensors are configured to measure multiple process data types.

20. The system of claim 9 further comprising multiple disruptors disposed above the dissolving tank.

21. A disruptor adjustment system comprising:
a disruptor assembly configured to disrupt a volume of smelt flowing from a smelt spout into a dissolving tank, wherein the disruptor assembly comprises an actuator operatively engaged to a disruptor;
a sensor configured to record process data from a recovery boiler; and
a control system configured to receive a sensor output signal from the sensor,
wherein the sensor output signal indicates the process data at a measured time, wherein the control system is further configured to compare the sensor output signal to a programmed operation range for the process data, and to send a disruptor input signal to disruptor assembly to change a first disruptor operating condition to a second disruptor operating condition when the sensor output signal is outside of the programmed operation range.

22. A method for monitoring and adjusting a disruptor operating condition for a disruptor disposed over a dissolving tank comprising:
receiving a sensor output signal from a sensor, the sensor output signal indicating a process condition in a recovery boiler at a measured time;
receiving a disruptor output signal from a disruptor assembly disposed over a dissolving tank indicating a current disruptor operating condition;
comparing the sensor output signal with a baseline smelt flow position for the process condition;
comparing the disruptor output signal with a baseline disruptor operating condition for the disruptor; and
sending a disruptor input signal to the disruptor to adjust the disruptor operating condition when the sensor output signal is outside a programmed operation range for the process condition.

23. The method of claim 22 further comprising receiving an agitator output signal from an agitator indicating a rate of agitation, and sending an agitator input signal to the agitator to adjust the rate of agitation when the disruptor output signal is outside of the programmed operation range for the disruptor.

24. The method of claim 22 further comprising sending a sensor input signal to the sensor to adjust a sensitivity to the process condition.

* * * * *